(12) United States Patent
Takemasa et al.

(10) Patent No.: US 6,372,026 B1
(45) Date of Patent: Apr. 16, 2002

(54) APPARATUS FOR PRODUCING OXYGEN ENHANCED GAS FROM AIR

(75) Inventors: Kenji Takemasa; Masaki Tachino, both of Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/510,154

(22) Filed: Feb. 22, 2000

(30) Foreign Application Priority Data

Feb. 19, 1998 (JP) .......................... 11-041481
Feb. 19, 1999 (JP) .......................... 11-041482

(51) Int. Cl.$^7$ .......................... B01D 53/053
(52) U.S. Cl. .............. 96/112; 96/124; 96/130
(58) Field of Search .............. 95/14, 17, 18, 95/130; 96/112, 124, 130, 144

(56) References Cited

U.S. PATENT DOCUMENTS

| | | | | |
|---|---|---|---|---|
| 3,359,706 A | * | 12/1967 | Zankey | 96/112 X |
| 4,194,891 A | * | 3/1980 | Earls et al. | 96/130 X |
| 4,197,095 A | * | 4/1980 | White, Jr. et al. | 96/112 X |
| 4,449,990 A | * | 5/1984 | Tedford, Jr. | 96/130 X |
| 4,455,861 A | * | 6/1984 | Alftine | 96/112 X |
| 4,496,376 A | * | 1/1985 | Hradek | 96/112 |
| 4,822,384 A | * | 4/1989 | Kato et al. | 96/130 X |
| 4,925,464 A | * | 5/1990 | Rabenau et al. | 96/124 |
| 4,927,434 A | * | 5/1990 | Cordes et al. | 96/112 X |
| 4,941,894 A | * | 7/1990 | Black | 96/112 X |
| 5,114,441 A | * | 5/1992 | Kanner et al. | 96/124 X |
| 5,425,240 A | * | 6/1995 | Jain et al. | 96/130 X |
| RE35,099 E | * | 11/1995 | Hill | 96/124 X |
| 5,505,825 A | * | 4/1996 | Gold et al. | 96/112 X |
| 5,593,478 A | * | 1/1997 | Hill et al. | 96/124 X |
| 5,917,135 A | * | 6/1999 | Michaels et al. | 96/112 X |
| 6,030,435 A | * | 2/2000 | Monereau et al. | 96/112 X |

FOREIGN PATENT DOCUMENTS

WO    WO93/16786    9/1993

* cited by examiner

Primary Examiner—Robert H. Spitzer
(74) Attorney, Agent, or Firm—Sughrue Mion, PLLC

(57) ABSTRACT

A fractionator produces an oxygen enhanced gas for use in oxygen inhalation therapy. The fractionator includes an air source for supplying air, and a plurality of columns for containing an adsorbent material for adsorbing nitrogen gas. Each of the columns has first and second open ends. Air is directed from the air source to the column through the first open ends of the respective columns. A temperature sensor detects the temperature of the side wall of one of the columns. The fractionator changes the time for adsorption of nitrogen gas to the adsorbent material based on the detected temperature.

10 Claims, 6 Drawing Sheets

APPARATUS FOR PRODUCING OXYGEN ENHANCED GAS FROM AIR

BACKGROUND OF THE INVENTION

1. Field of the Invention

The invention relates to an improved apparatus for producing oxygen enhanced gas from air.

2. Description of the Related Art

Oxygen inhalation therapy has been employed as a most effective method of treatment for a malady of the respiratory system such as asthma, pulmonary emphysema or chronic bronchitis. In oxygen inhalation therapy, an oxygen enhanced gas, which is produced by separating nitrogen gas from air, is supplied to the patient. For this purpose, a fractionator or an apparatus for producing an oxygen enhanced gas from air has been developed. In particular, a compact fractionator is suitable for conducting oxygen inhalation therapy domestically.

WO 93/16876 discloses a fractionator for producing an oxygen enhanced gas by separating nitrogen gas from air. The fractionator has a plurality of columns filled with an adsorbent material and rotary valve for distributing air selectively to the columns.

The fractionator produces the oxygen enhanced gas with high efficiency when the temperature of the adsorbent material is within a temperature range. However, if the temperature of the adsorbent material is out of the range due to, for example change in the air temperature, the production of the oxygen enhanced gas is much reduced.

SUMMARY OF THE INVENTION

The invention is directed to solve the prior art problems, and to provide an apparatus for producing oxygen enhanced gas from air which is improved to maintain the production efficiency at a level in spite of changes in air temperature.

The invention provides an apparatus for producing an oxygen enhanced gas for use in oxygen inhalation therapy. The apparatus includes an air source for supplying air; a plurality of columns for containing an adsorbent material for adsorbing nitrogen gas, each of the columns having first and second open ends; means for directing the air from the air source to the column through the first open ends of the respective columns; an oxygen enhanced gas tank, fluidly connected to the second open ends of the respective columns, for receiving oxygen enhanced gas from the columns; a switching mechanism, provided adjacent to the first open ends of the columns, for sequentially selectively switching columns to which the air is supplied from the air source and columns from which the adsorbed nitrogen is released for regeneration of the adsorbent material so that the respective columns repeatedly adsorb nitrogen gas and release the adsorbed nitrogen gas according to an adsorption-regeneration cycle; a temperature sensor for detecting a temperature representing the temperature of the adsorbent material; and a controller for controlling the adsorption-regeneration cycle based on the representative temperature detected by the sensor.

The temperature sensor may be preferably attached to a side wall of one of the columns.

According to a preferred embodiment, the adsorbent material may include 13X type zeolite. In this case, the controller controls the adsorption-regeneration cycle to reduce the time for adsorption of the nitrogen gas when the representative temperature is not less than 20° C.

According to another embodiment, the adsorbent material may include 5A type zeolite. In this case, the controller controls the adsorption-regeneration cycle to reduce the time for adsorption of the nitrogen gas when the representative temperature is not more than 20° C.

According to another feature of the invention, the apparatus may include an air source for supplying air; a plurality of columns for containing an adsorbent material for adsorbing nitrogen gas, each of the columns having first and second open ends; means for directing the air from the air source to the inside of the column through the first open ends of the respective columns; an oxygen enhanced gas tank, fluidly connected to the second open ends of the respective columns, for receiving oxygen enhanced gas from the columns; a temperature sensor for detecting a temperature representing the temperature of the adsorbent material; and a temperature controller for controlling the temperature of the adsorbent material based on the representative temperature detected by the temperature sensor.

The preferred adsorbent material for this apparatus may include 5A type zeolite, and the temperature controller heats the columns to maintain the representative temperature within a temperature range 20 to 60° C.

The apparatus also may include a switching mechanism, provided adjacent to the first open ends of the columns, for sequentially selectively switching columns to which the air is supplied from the air source and columns from which the adsorbed nitrogen is released for regeneration of the adsorbent material so that the respective columns repeatedly adsorb nitrogen gas and release the adsorbed nitrogen gas according to an adsorption-regeneration cycle.

DESCRIPTION OF THE DRAWINGS

These and other objects and advantages and further description will now be discussed in connection with the drawings in which.

DESCRIPTION OF THE PREFERRED EMBODIMENTS

With reference to FIGS. 1–6, a first embodiment of the invention will be described below.

Figure 1:
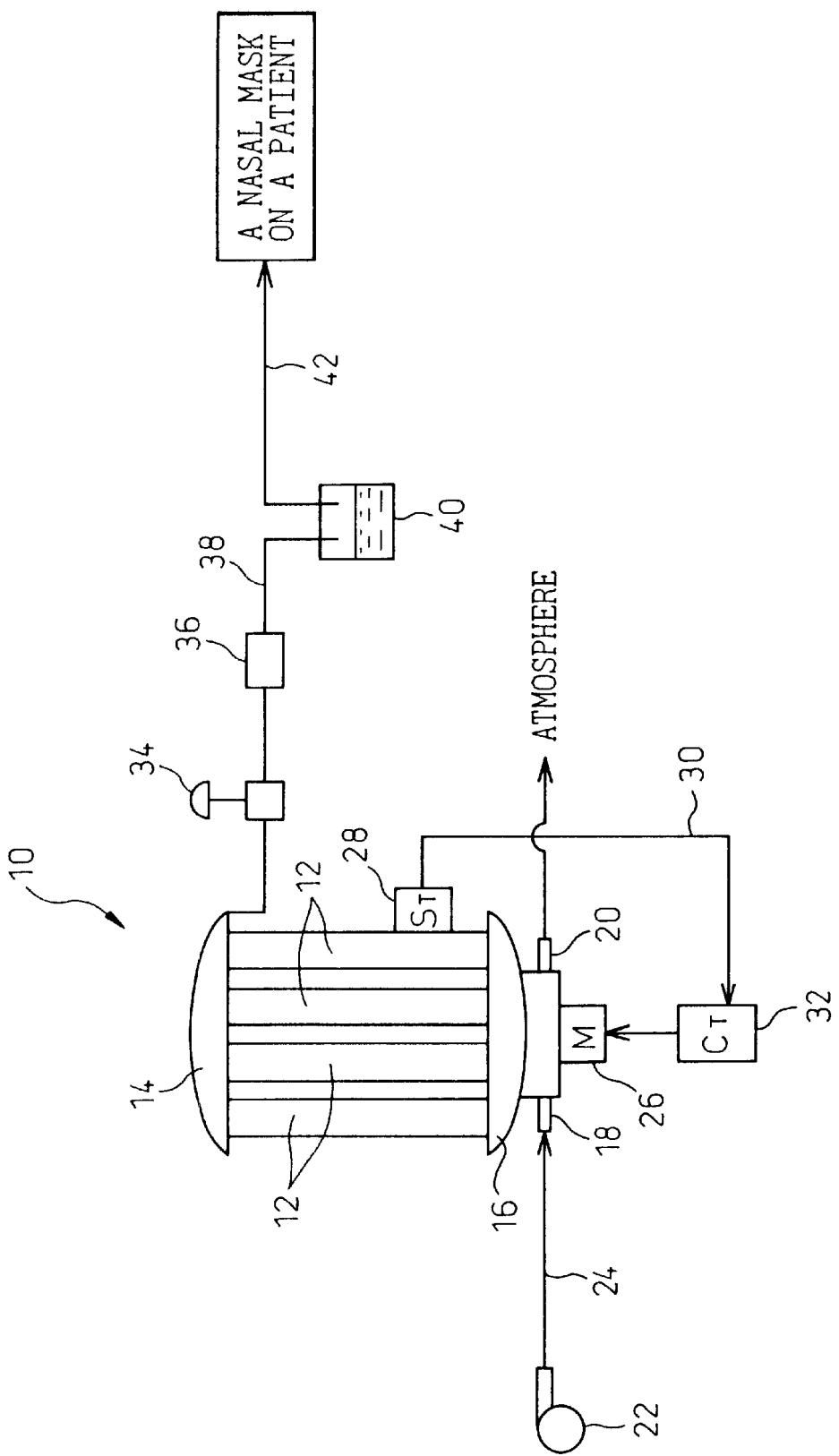
FIG. 1 is an schematic illustration of a fractionator according to the first embodiment of the invention.

In FIG. 1, a fractionator 10 according to the embodiment of the invention includes a plurality of columns 12 for containing adsorbent material which adsorbs nitrogen gas much more than oxygen gas, top and bottom tanks 14 and 16 fluidly connected to the columns 12, a rotary distributor (not shown in FIG. 1) provided within the bottom tank 16 and a rotary mechanism 26 such as an AC motor 26 for driving the rotary distributor. The columns 12 have top and bottom open ends for the fluid communication with the top and bottom tanks 14 and 16. A controller 32 is provided for controlling the rotational speed of the AC motor 26 based on temperature detected by a temperature sensor 28 and output to the controller 32 via signal line 30. The temperature sensor 28 is put on the side wall of one of the columns 12. The controller 32 may include an inverter which changes the frequency of the alternating current supplied to the AC motor 26 based on the temperature detected by the temperature sensor 28. The temperature detected by the sensor 28 is assumed to represent the temperature of the adsorbent material within the columns 12. In this connection, the temperature detected by the sensor 28 is referred to the representative temperature.

The top tank 14 is fluidly connected to a nasal mask put on a patient through first and second conduits 38 and 42 between which a humidifier 40 is provided. The first conduit 38 includes a flow adjustment valve 34 and a flow setter 36. The bottom tank 16 includes an air inlet port 18 and an exhaust port 20 through which nitrogen gas is discharged. The air inlet port 18 is fluidly connected to an air source or a blower 22 through an air conduit 24. The blower 22 supplies air at a predetermined pressure, for example 1.0 atm-g.

Figure 2:
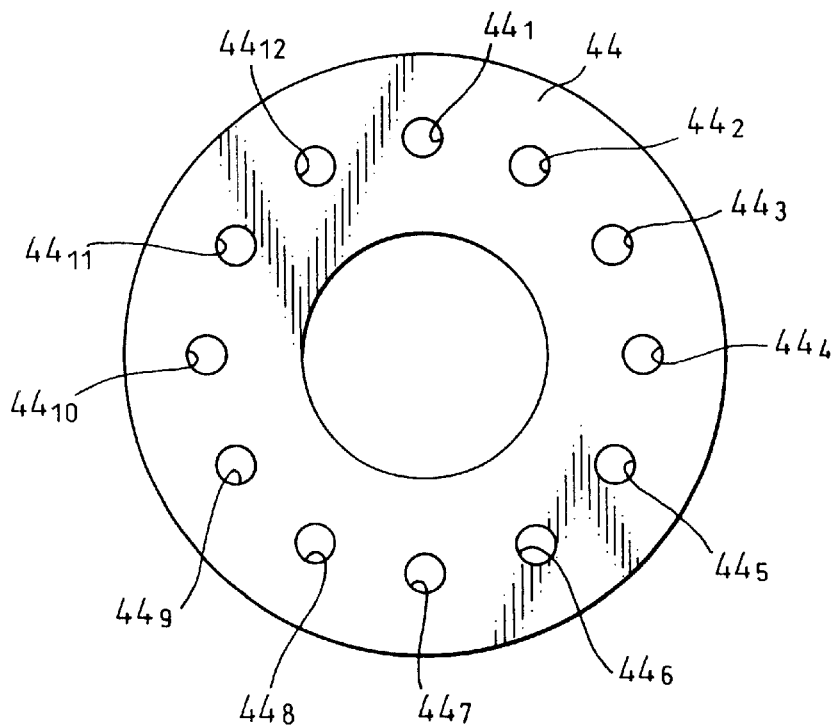
FIG. 2 is plan view of a stationary disk of a distributing mechanism.
Figure 3:
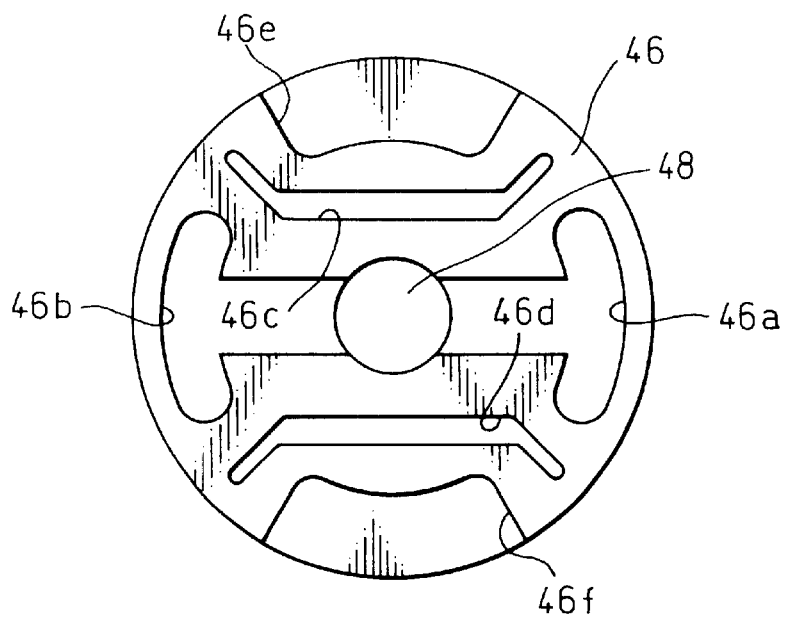
FIG. 3 is plan view of a rotary disk of a distributing mechanism.

With reference to FIGS. 2 and 3, the rotary distributing mechanism includes a stationary disk 44 which is connected to the bottom ends of the columns 12 and a rotary disk 46 disposed in contact with lower surface of the stationary disk 44. The stationary disk 44 defines a plurality of orifices $44_1$ to $44_{12}$ which are arranged along a circle about the center of the stationary disk 44. Each of the plurality of orifices $44_1$ to $44_{12}$ is fluidly connected to inside of the corresponding column 12 through the bottom open end thereof.

The rotary disk 46 is operatively connected to the shaft of the AC motor 26 to be rotated about its center relative to the stationary disk 44. The rotary disk 46 includes three sets of channels and a central air inlet opening 48 which is fluidly connected to the air inlet port 18. The three sets of channels consist of inlet channels 46a and 46b, intermediate channels 46c and 46d and exhaust channels 46e and 46f. Each of the inlet channels 46a and 46b is substantially formed into "T" shape having radial and peripheral portions and extends radially symmetrically to each other about the central air inlet opening 48. The intermediate channels 46c and 46d are provided symmetrically about the inlet channels 46a and 46b. The exhaust channels 46e and 46f are also provided symmetrically about the inlet channels 46a and 46b.

The orifices $44_1$ and $44_2$, $44_7$ and $44_8$ are fluidly connected to the air inlet port 18, the orifices $44_9$ and $44_{12}$, $44_3$ and $44_6$ are fluidly connected to each other through the intermediate channels 46c and 46d, and the orifices $44_{10}$ and $44_{11}$, $44_4$ and $44_5$ are fluidly connected to outside of the bottom tank 16 or the atmosphere through the exhaust channels 46e and 46f, when the rotary disk 46 is positioned relative to the stationary disk 44 so that inlet channels 46a and 46b are aligned with the orifices $44_1$ and $44_2$, $44_7$ and $44_8$; the intermediate channels 46c and 46d are aligned with the orifices $44_9$ and $44_{12}$, $44_3$ and $44_6$; and the exhaust channels 46e and 46f are aligned with the orifices $44_{10}$ and $44_{11}$, $44_4$ and $44_5$. In this disposition, air is supplied through the inlet channels 46a and 46b and the orifices $44_1$ and $44_2$, $44_7$ and $44_8$ to the columns 12 disposed corresponding to the orifices $44_1$ and $44_2$, $44_7$ and $44_8$, where the internal pressure of the columns increases and the large amount of nitrogen gas is separated by the adsorption to the adsorbent material and oxygen enhanced gas is produced and discharged into the top tank 14 through the top open ends of the columns. On the other hand, the internal pressure within the columns 12 disposed corresponding to the orifices $44_{10}$ and $44_{11}$, $44_4$ and $44_5$ decreases to the atmospheric pressure through the exhaust channels 46e and 46h, and the adsorbed nitrogen gas is separated from the adsorbent due to the pressure drop. On the other hand, the internal pressure within the columns 12 disposed corresponding to the orifices $44_9$ and $44_{12}$, $44_3$ and $44_6$ are equalized to each other through the intermediate channels 46c and 46d. Check valve mechanisms, for preventing the counter flow of the produced oxygen enhanced gas, may be provided on the top open ends of the respective columns 12.

Rotation of the rotary disk 46 moves the channels 46a–46f relative to the orifices $44_1$ to $44_{12}$ of the stationary disk 44. If the rotary disk 46 rotates in the counter-clockwise direction by 30 degrees, which corresponds to the rotational angle between the adjacent orifices, the inlet channels 46a and 46b are aligned with the orifices $44_{12}$ and $44_1$, $44_6$ and $44_7$, the intermediate channels 46c and 46d are aligned with the orifices $44_8$ and $44_{11}$, $44_2$ and $44_5$, and the exhaust channels 46e and 46f are aligned with the orifices $44_9$ and $44_{10}$, $44_3$ and $44_4$. Therefore, the orifices $44_{12}$ and $44_1$, $44_6$ and $44_7$ are fluidly connected to the air inlet port 18, the orifices $44_8$ and $44_{11}$, $44_2$ and $44_5$ are fluidly connected to each other through the intermediate channels 46c and 46d, and the orifices $44_9$ and $44_{10}$, $44_3$ and $44_4$ are fluidly connected to outside of the bottom tank 16 through the exhaust channels 46e and 46f. In this disposition, air is supplied through the inlet channels 46a and 46b and the orifices $4_{12}$ and $44_1$, $44_6$ and $44_7$ to the columns 12 disposed corresponding thereto. The internal pressure within the columns 12 disposed corresponding to the orifices $44_9$ and $44_{10}$, $44_3$ and $44_4$ decreases to the atmospheric pressure through the exhaust channels 46e and 46f, and the adsorbed nitrogen gas is separated from the adsorbent by the pressure drop. The internal pressure within the columns 12 disposed corresponding to the orifices $44_8$ and $44_{11}$, $44_2$ and $44_5$ are equalized to each other through the intermediate channels 46c and 46d.

Thus, the rotation of the rotary disk 46 causes the adsorption-regeneration cycle of the respective columns 12 of the fractionator 10. The nitrogen gas is separated from the air which is supplied to the columns 12, disposed onto the inlet channels 46a and 46b, by the adsorption to the adsorbent. The oxygen enhanced gas is produced and discharged from the columns 12 to the top tank 14. The adsorbed nitrogen will be released from the adsorbent and discharged to the outside of the fractionator 10 when the corresponding columns 12 are relatively disposed onto the exhaust channels 46e and 46f.

The adsorbent material adsorbs nitrogen gas much more than oxygen gas, and can include zeolite, in particular 13X type zeolite, which is available on the market as OXYSIV-5 or OXYSIV-7 from Union Carbide Corporation, located in Danbury, Conn. The zeolite adsorbent may be 5A type zeolite, which is also available on the market as 5AMG from Union Carbide Corporation.

Figure 4:
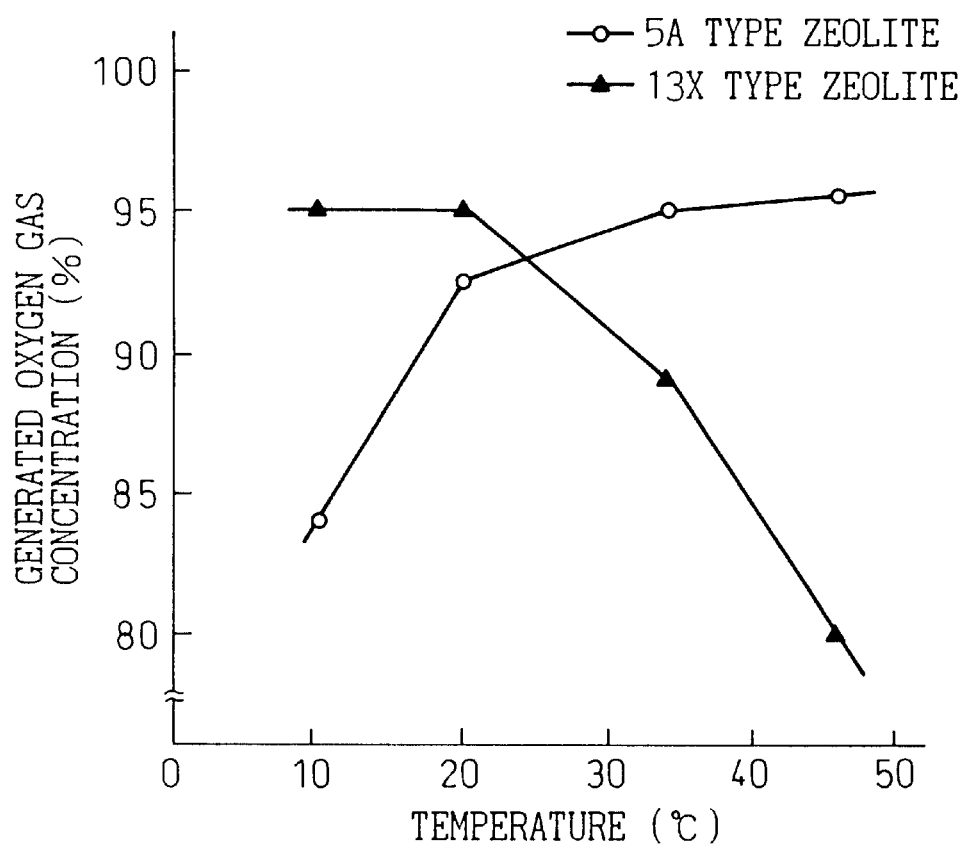
FIG. 4 is a graph showing the adsorption characteristics of zeolite relative to changes in the temperature thereof.

FIG. 4 shows experimental results obtained, in terms of 13X type zeolite and 5A type zeolite, by using an experimental apparatus which includes a single column substantially identical to the above-described embodiment. In FIG. 4, the vertical axis is the volume fraction of the oxygen gas relative to the generated oxygen enhanced gas, and the horizontal axis is the temperature detected by the sensor attached to the side wall of the column.

As can be seen from FIG. 4, in case of 13X type zeolite, when the representative temperature is lower than 20° C., the oxygen concentration does not substantially change with a change in temperature. However, in the temperature range above 20° C., the oxygen concentration decreases with the increase in the temperature. This means that the nitrogen adsorption efficiency of 13X type zeolite is decreased in the temperature range above 20° C. On the other hand, in case of 5A type zeolite, when the representative temperature is lower than 20° C., the oxygen concentration increases with the increase in the temperature. However, in the temperature range above 20° C., the change in the oxygen concentration becomes flat. This means that the nitrogen adsorption efficiency of 5A type zeolite is decreased at the temperature range below 20° C.

Therefore, in case of 13X type zeolite, with the fractionator 10 according to the embodiment shown in FIG. 1, the time for the nitrogen adsorption must be reduced in the temperature range above 20° C. in order to maintain the over-all nitrogen adsorption efficiency high. For this purpose, the rotational speed of the AC motor 26 is increased. On the other hand, in case of 5A type zeolite, the time for the nitrogen adsorption must be reduced in the temperature range below 20° C. For this purpose, the rotational speed of the AC motor 26 is increased. In this connection, in the specification, cycle time $T_c$ is defined as follows:

$$T_c = T/N$$

where

T: time for one rotation of the rotary disk

N: number of the orifices formed in the stationary disk

The increase or reduction of the time for the nitrogen adsorption is equivalent to the increase or reduction of the cycle time and also to the reduction or increase of the rotational speed of the rotary disk 46.

Figure 5:
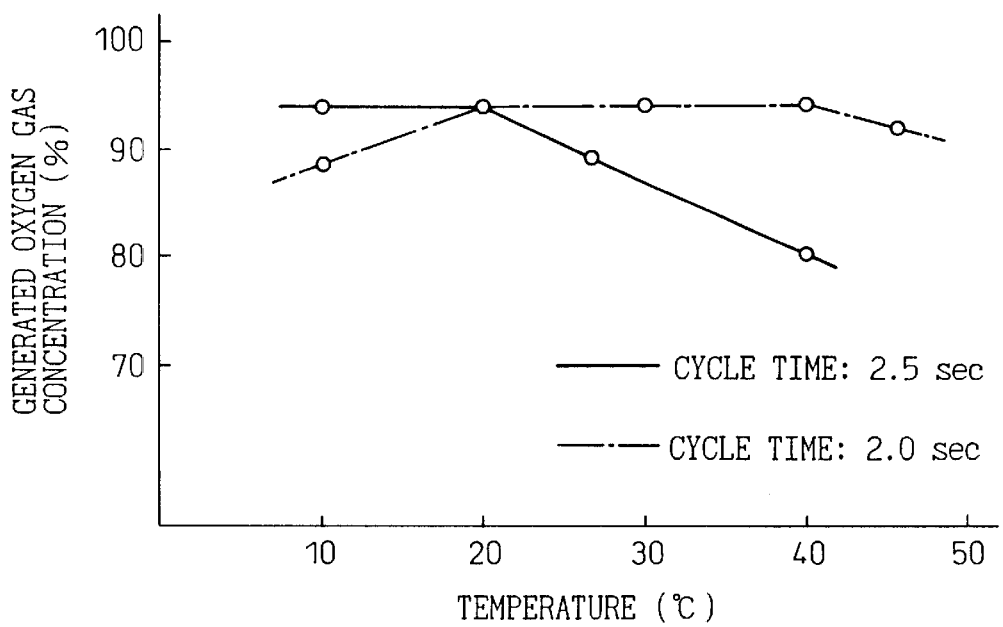
FIG. 5 is a graph showing experimental results of the fractionator shown in FIG. 1.
Figure 6:
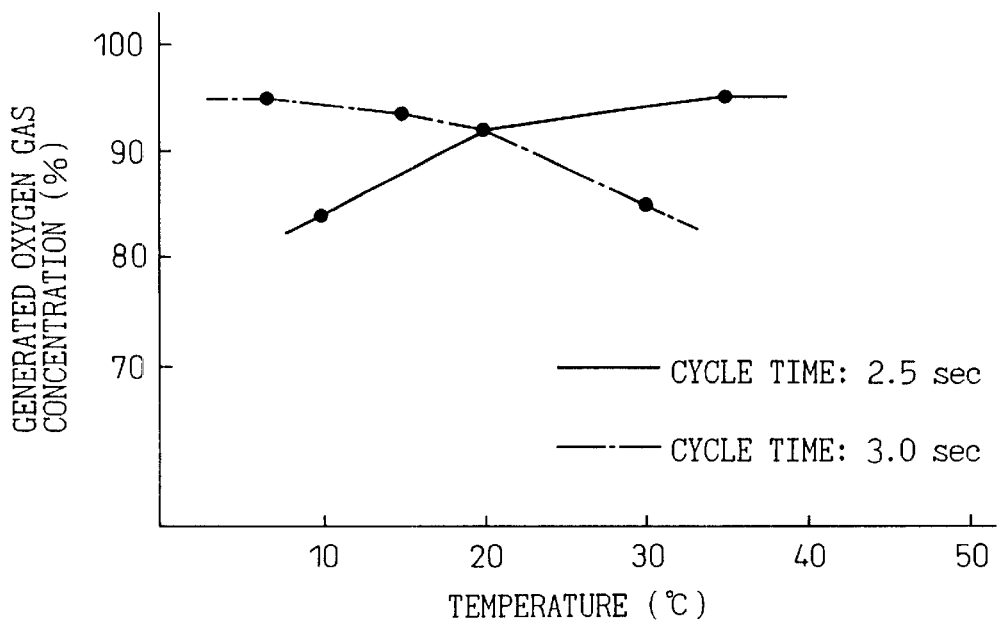
FIG. 6 is a graph showing other experimental results of the fractionator shown in FIG. 1.

FIGS. 5 and 6 show the other experimental results which were executed by using a fractionator shown in FIG. 1. FIG. 5 shows the change in oxygen concentration of the oxygen enhanced gas relative to the representative temperature detected by the temperature sensor 28, with 13X type zeolite filled in the columns 12. As can be seen from FIG. 5, the operation with the cycle time of 2.0 sec provides better results than the operation with cycle time of 2.5 sec in the temperature range above 20° C. FIG. 6 is a graph similar to that of FIG. 5, with 5A type zeolite filled in the columns 12. As can be seen from FIG. 6, the operation with the cycle time of 2.5 sec acquires better results than the operation with cycle time of 2.0 sec in the temperature range above 20° C.

Figure 7:
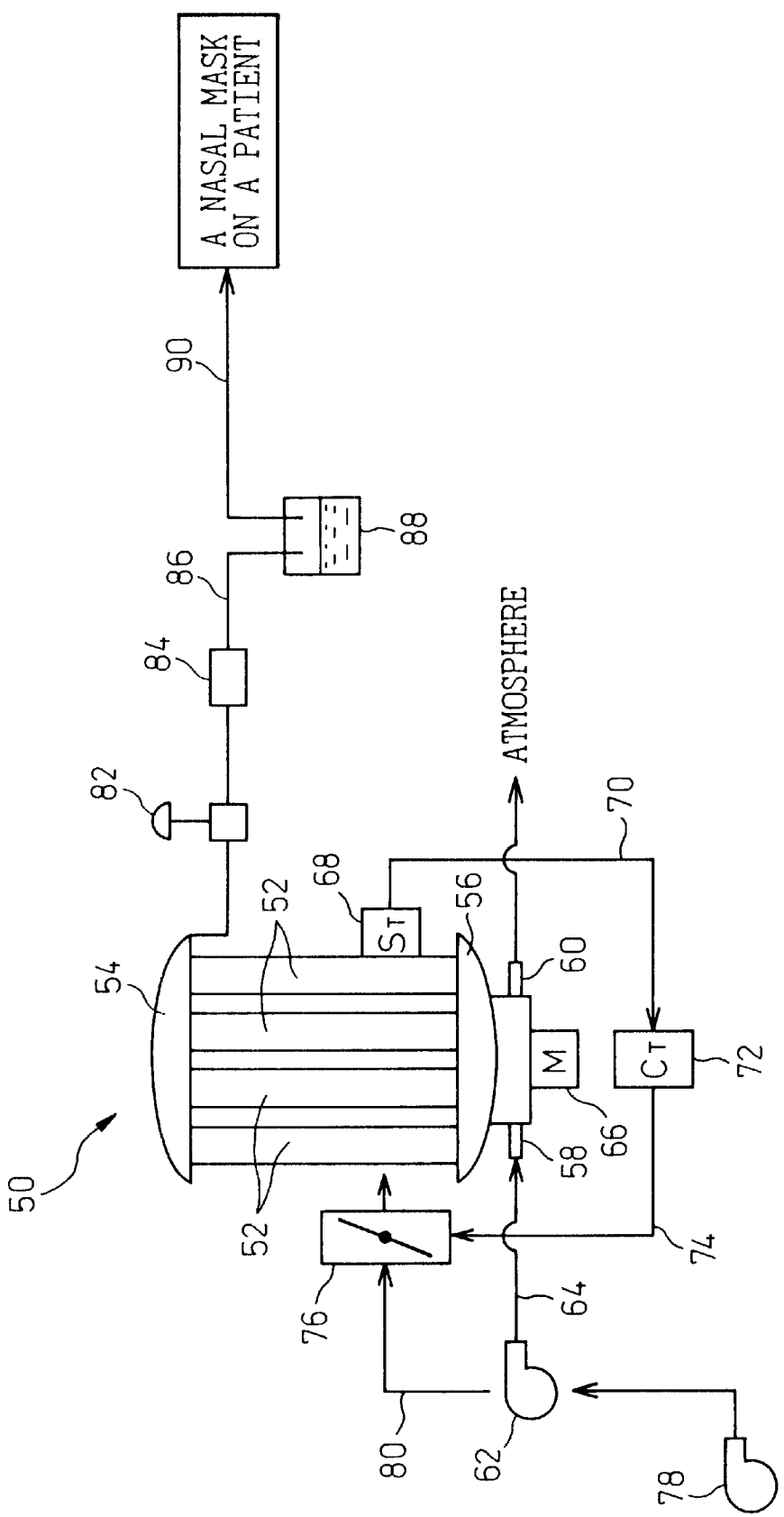
FIG. 7 is an schematic illustration of a fractionator according to the second embodiment of the invention.

With reference to FIG. 7, a second embodiment of the invention will be described below.

In FIG. 7, a fractionator 50 according to the embodiment of the invention includes a plurality of columns 52 for containing the adsorbent material the same as the first embodiment, top and bottom tanks 54 and 56 fluidly connected to the columns 52, a rotary distributor the same as the first embodiment shown in FIGS. 2 and 3 and a rotary mechanism or an AC motor 66 for rotating the rotary distributor.

The top tank 54 is connected to a nasal mask put on a patient through first and second conduits 86 and 90 between which a humidifier 88 is provided. The first conduit 86 includes a flow adjustment valve 82 and a flow setter 84. The bottom tank 56 includes an air inlet port 58 and an exhaust port 60 through which nitrogen gas is discharged. The air inlet port 58 is fluidly connected to an air source or a blower 62 through an air conduit 64.

According to the second embodiment, the fractionator 50 further comprises a heating device for controlling the temperature of the columns 52. The heating device includes a fan 78 for generating an air flow, an air duct 80 for directing the air flow to the blower 62 for cooling the blower 62 and a flow controller or a damper 76 provided on the air duct 80 for controlling the air flow rate through the air duct 80. A controller 72 is provided for controlling the opening of the damper 76 via signal line 74, based on the representative temperature detected by a temperature sensor 68 and output to the controller via signal line 70. The temperature sensor 68 is put on the side wall of one of the columns 52.

The air flow directed to the blower 62 is heated by heat exchange with the blower 62. The duct 80 also directs the air flow from the blower 62 to the columns 52 to heat the columns 52.

Figure 8:
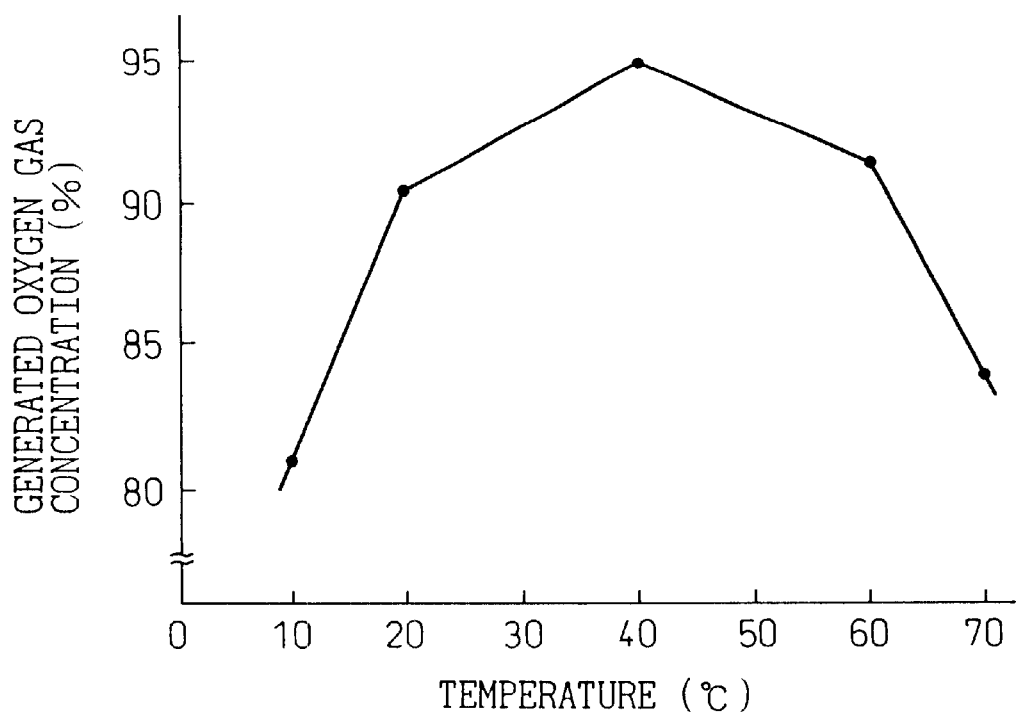
FIG. 8 is a graph showing experimental results of the fractionator shown in FIG. 7.

FIG. 8 shows experimental results executed by using an experimental apparatus substantially the same as the second embodiment with 5A type zeolite, except that the heating device of the experimental apparatus is an electric heater which can heat the columns 52 up to a desired temperature. In FIG. 8, the vertical axis is the oxygen gas concentration in the produced oxygen enhanced gas, and the horizontal axis is the representative temperature. The oxygen concentration was measured with the side wall temperature set to a predetermined value. As can be seen from FIG. 8, the oxygen gas concentration in the produced oxygen enhanced gas is not less than 90% when the representative temperature detected by the sensor 68 is 20–60° C., and it takes maximum value of 96% when the representative temperature is around 40° C.

Therefore, it is preferable that the controller 72 controls the opening of the damper 76 to maintain the representative temperature detected by the sensor 68 in the range 20–60° C.

Although the heating device utilizes the air flow used for cooling the blower 62 in FIG. 7, the heating device can include an electric heater for maintaining the representative temperature of the side walls of the columns 52. In this case, the controller 72 controls the current supplied to the electric heater.

It will also be understood by those skilled in the art that the forgoing description is a preferred embodiment of the disclosed device and that various changes and modifications may be made without departing from the spirit and scope of the invention.

We claim:

1. An apparatus for producing an oxygen enhanced gas for use in oxygen inhalation therapy; comprising, an air source for supplying air;

a plurality of columns for containing an adsorbent material for adsorbing nitrogen gas, each of the columns having first and second open ends;

means for directing the air from the air source to the column through the first open ends of the respective columns;

an oxygen enhanced gas tank, fluidly connected to the second open ends of the respective columns, for receiving oxygen enhanced gas from the columns;

a switching mechanism, provided adjacent to the first open ends of the columns, for sequentially selectively switching columns to which the air is supplied from the air source and columns from which the adsorbed nitrogen is released for regeneration of the adsorbent material so that the respective columns repeatedly adsorb nitrogen gas and release the adsorbed nitrogen gas according to an adsorption-regeneration cycle;

a temperature sensor for detecting a temperature representing the temperature of the adsorbent material; and a controller for controlling the adsorption-regeneration cycle based on the representative temperature detected by the sensor.

2. An apparatus according to claim 1, wherein the temperature sensor is attached to a side wall of one of the columns.

3. An apparatus according to claim 1, wherein the adsorbent material is a 13X zeolite; and the controller controlling the adsorption-regeneration cycle to reduce the time for adsorption of the nitrogen gas when the representative temperature is not less than 20° C.

4. An apparatus according to claim 1, wherein the adsorbent material is a 5A zeolite; and the controller controlling the adsorption-regeneration cycle to reduce the time for adsorption of the nitrogen gas when the representative temperature is not more than 20° C.

5. An apparatus according to claim 1, wherein the switching mechanism comprises a stationary disk defining a plurality of orifices arranged along a circle about the center of the stationary disk, a rotary disk arranged to contact one face of the stationary disk, and a motor for rotating the rotary disk;

the rotary disk including an inlet channel fluidly connected to the air source and an exhaust channel fluidly connected to the atmosphere;

each of the columns being disposed to each of the orifices to provide fluid communication between the first open end and the corresponding orifice;

the rotary disk being rotated to move the inlet, intermediate and exhaust channels relative to the orifices of the stationary disk, the inlet and exhaust channels being sequentially moved relative to the orifices of the stationary disk to switch the orifice which is fluidly connected to the air source and the orifice which is fluidly connected to the atmosphere.

6. An apparatus for producing an oxygen enhanced gas for use in oxygen inhalation therapy; comprising, an air source for supplying air;

a plurality of columns for containing an adsorbent material for adsorbing nitrogen gas, each of the columns having first and second open ends;

means for directing the air from the air source to inside of the column through the first open ends of the respective columns;

an oxygen enhanced gas tank, fluidly connected to the second open ends of the respective columns, for receiving oxygen enhanced gas from the columns;

a temperature sensor for detecting a temperature representing the temperature of the adsorbent material; and a temperature controller for controlling the temperature of the adsorbent material based on the representative temperature detected by the temperature sensor.

7. An apparatus according to claim 6, wherein the temperature sensor is attached to a side wall of one of the columns.

8. An apparatus according to claim 6, wherein the adsorbent material is a 5A zeolite; and the temperature controller heating the columns to maintain the representative temperature within a temperature range 20 to 60° C.

9. An apparatus according to claim 6 further comprising a switching mechanism, provided adjacent to the first open ends of the columns, for sequentially selectively switching columns to which the air is supplied from the air source and columns from which the adsorbed nitrogen is released for regeneration of the adsorbent material so that the respective columns repeatedly adsorb nitrogen gas and release the adsorbed nitrogen gas according to an adsorption-regeneration cycle.

10. An apparatus according to claim 9, wherein the switching mechanism comprises a stationary disk defining a plurality of orifices arranged along a circle about the center of the stationary disk, a rotary disk arranged to contact one face of the stationary disk, and a motor for rotating the rotary disk;

the rotary disk including an inlet channel fluidly connected to the air source and an exhaust channel fluidly connected to the atmosphere;

each of the columns being disposed at each of the orifices to provide fluid communication between the first open end and the corresponding orifice;

the rotary disk being rotated to move the inlet, intermediate and exhaust channels relative to the orifices of the stationary disk, the inlet and exhaust channels being sequentially moved relative to the orifices of the stationary disk to switch the orifice which is fluidly connected to the air source and the orifice which is fluidly connected to the atmosphere.

* * * * *

UNITED STATES PATENT AND TRADEMARK OFFICE
CERTIFICATE OF CORRECTION

| | | |
|---|---|---|
| PATENT NO. | : 6,372,026 B1 | Page 1 of 1 |
| DATED | : April 19, 2002 | |
| INVENTOR(S) | : Kenji Takemasa and Masaki Tachino | |

It is certified that error appears in the above-identified patent and that said Letters Patent is hereby corrected as shown below:

<u>Title page,</u>
Item [30], Foreign Application Priority Data, the date of the first mentioned foreign priority document should be changed from "Feb. 19, 1998" to -- Feb. 19, 1999 --.

Signed and Sealed this

Fifteenth Day of October, 2002

*Attest:*

JAMES E. ROGAN
*Attesting Officer*   *Director of the United States Patent and Trademark Office*